US012643391B2

(12) United States Patent　　　　　　　(10) Patent No.:　US 12,643,391 B2
He et al.　　　　　　　　　　　　　　　(45) Date of Patent:　Jun. 2, 2026

(54) FLUID MANAGEMENT APPARATUS AND HEAT MANAGEMENT SYSTEM

(71) Applicant: ZHEJIANG SANHUA AUTOMOTIVE COMPONENTS CO., LTD., Hangzhou (CN)

(72) Inventors: Deping He, Hangzhou (CN); Jiahe Liang, Hangzhou (CN); Zhengyi Yin, Hangzhou (CN); Yao Liu, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 429 days.

(21) Appl. No.: 18/268,360

(22) PCT Filed: Dec. 23, 2021

(86) PCT No.: PCT/CN2021/140762
§ 371 (c)(1),
(2) Date: Jun. 20, 2023

(87) PCT Pub. No.: WO2022/135510
PCT Pub. Date: Jun. 30, 2022

(65) Prior Publication Data
US 2024/0017605 A1　　Jan. 18, 2024

(30) Foreign Application Priority Data

Dec. 23, 2020　(CN) ......................... 202011532867.3
Dec. 23, 2020　(CN) ......................... 202011536361.X

(51) Int. Cl.
　B60K 11/04　　　　(2006.01)
　B60K 11/02　　　　(2006.01)
　　　　(Continued)

(52) U.S. Cl.
CPC .............. B60K 11/04 (2013.01); B60K 11/02 (2013.01); F01P 5/10 (2013.01); F01P 7/165 (2013.01);
(Continued)

(58) Field of Classification Search
CPC .... B60K 11/04; B60K 11/02; F01P 2005/105; F01P 5/10; F01P 7/165; F01P 11/029;
(Continued)

(56) References Cited

U.S. PATENT DOCUMENTS 10,665,908 B2 * 5/2020 Krull ................... H01M 10/613
11,411,268 B2 * 8/2022 Kim ......................... F01P 5/10
(Continued)

FOREIGN PATENT DOCUMENTS

CN　　　109562685 A　　4/2019
CN　　　110481275 A　　11/2019
(Continued)

OTHER PUBLICATIONS

The European Search Report issued on Oct. 17, 2024 for the European counterpart application No. 21909505.6.
(Continued)

*Primary Examiner* — Craig M Schneider
*Assistant Examiner* — Christopher D Ballman
(74) *Attorney, Agent, or Firm* — Yue (Robert) Xu; Apex Attorneys at Law, LLP

(57) ABSTRACT

A fluid management apparatus and a heat management system are provided. The fluid management apparatus includes a connecting piece and a liquid storage part. The connecting piece and the liquid storage part are arranged separately, and a first mating part of a liquid storage part shell is sealedly connected to a first connecting port portion of the connecting piece. A liquid storage cavity of the liquid storage part is in communication with a flow channel of the
(Continued)

connecting piece, and the connecting piece, which is provided with a flow channel, is arranged separately from the liquid storage part.

17 Claims, 9 Drawing Sheets

(51) Int. Cl.

| | |
|---|---|
| *F01P 5/10* | (2006.01) |
| *F01P 7/16* | (2006.01) |
| *F16K 11/085* | (2006.01) |
| *F16K 27/06* | (2006.01) |
| *B60H 1/00* | (2006.01) |
| *F01P 11/02* | (2006.01) |

(52) U.S. Cl.
CPC ........ *F16K 11/0853* (2013.01); *F16K 27/065* (2013.01); *B60H 1/00485* (2013.01); *F01P 2005/105* (2013.01); *F01P 11/029* (2013.01)

(58) Field of Classification Search
CPC .......................... F16K 11/0853; F16K 27/065; B60H 1/00485
See application file for complete search history.

(56) References Cited

U.S. PATENT DOCUMENTS

| | | | |
|---|---|---|---|
| 11,766,915 B2 * | 9/2023 | Hwang | ..................... F01P 5/10 165/202 |
| 2015/0345368 A1 * | 12/2015 | Le Poul | ............. B65D 51/1644 123/41.51 |
| 2017/0373359 A1 | 12/2017 | Krull et al. | |
| 2021/0218088 A1 | 7/2021 | Kim | |
| 2022/0314737 A1 | 10/2022 | Hwang et al. | |

FOREIGN PATENT DOCUMENTS

| | | |
|---|---|---|
| CN | 110843465 A | 2/2020 |
| CN | 113119716 A | 7/2021 |
| CN | 113733842 A | 12/2021 |
| EP | 3885169 A1 | 9/2021 |
| EP | 3936709 A1 | 1/2022 |
| FR | 3066587 A1 | 11/2018 |
| KR | 102359325 B1 | 2/2022 |
| WO | 2020246792 A1 | 12/2020 |

OTHER PUBLICATIONS

International Search Report for PCT/CN2021/140762 mailed Mar. 28, 2022, ISA/CN.

* cited by examiner

160

355

401

400/410

354/3542

402

130

144

131

143          142          141          160'

FLUID MANAGEMENT APPARATUS AND HEAT MANAGEMENT SYSTEM

This application is the national phase of International Application No. PCT/CN2021/140762, titled "FLUID MANAGEMENT APPARATUS AND HEAT MANAGEMENT SYSTEM", filed on Dec. 23, 2021, which claims the benefits of priorities to the following two Chinese Patent Applications, Chinese Patent Application No. 202011532867.3, titled "FLUID MANAGEMENT APPARATUS AND HEAT MANAGEMENT SYSTEM", filed with the China National Intellectual Property Administration on Dec. 23, 2020; and Chinese Patent Application No. 202011536361.X, titled "FLUID MANAGEMENT APPARATUS AND ELECTRIC VALVE", filed with the China National Intellectual Property Administration on Dec. 23, 2020, the entire disclosures thereof are incorporated herein by reference.

FIELD

The present application relates to the technical field of fluid management, and in particular to a fluid management apparatus and a thermal management system.

BACKGROUND

A thermal management system includes multiple functional parts, the multiple functional parts of the system are integrated together, and the complex structure of integrated parts is not conducive to processing and forming.

SUMMARY

An object of the present application is to provide a fluid management apparatus and a thermal management system, to facilitate processing of fluid management apparatus.

On one hand, a fluid management apparatus is provided according to an embodiment of the technical solution of the present application, including a connecting member and a liquid storage portion, where the connecting member and the liquid storage portion are arranged separately, the connecting member is fixedly connected or limitedly connected with the liquid storage portion; the liquid storage portion includes a liquid storage portion shell and a liquid storage cavity, the connecting member includes a first connecting port portion, the liquid storage portion shell includes a first matching portion, the first matching portion is sealedly connected with the first connecting port portion, the connecting member is provided with a flow channel, the flow channel is located in the connecting member, and the liquid storage cavity is in communication with the flow channel.

On the other hand, a thermal management system is further provided according to an embodiment of the technical solution of the present application, the thermal management system includes a radiator, a second heat exchanger, a third heat exchanger and a fluid management apparatus, where the fluid management apparatus is the above fluid management apparatus, the fluid management apparatus includes a throttle valve, a first heat exchanger, a first pump and/or a second pump, the throttle valve is fixedly connected or limitedly connected with the first heat exchanger, the first heat exchanger has a first heat exchange passage and a second heat exchange passage, the throttle valve can throttle and depressurize a refrigerant entering the first heat exchange passage; the first flow channel is in communication with the fourth flow channel through the second heat exchange passage, the fourth flow channel is in communication with a cavity of the first pump, and the fourth flow channel is in communication with a cavity of the second pump; the third flow channel is in communication with the fourth flow channel through the radiator, the second flow channel is in communication with the second pump through the second heat exchanger, and the fifth flow channel is in communication with the first pump through the third heat exchanger.

According to the fluid management apparatus and the thermal management system provided by the above embodiments of the present application, the fluid management apparatus includes the connecting member and the liquid storage portion, and the connecting member and the liquid storage portion are separately arranged, the first matching portion of the liquid storage portion shell is sealedly connected with the first connecting port portion of the connecting member, the liquid storage cavity of the liquid storage portion is in communication with the flow channel of the connecting member, the connecting member having the flow channel and the liquid storage portion are separately arranged, so that the processing of the connecting member and the liquid storage portion is relatively simple.

DETAILED DESCRIPTION OF THE EMBODIMENTS

Figure 1:
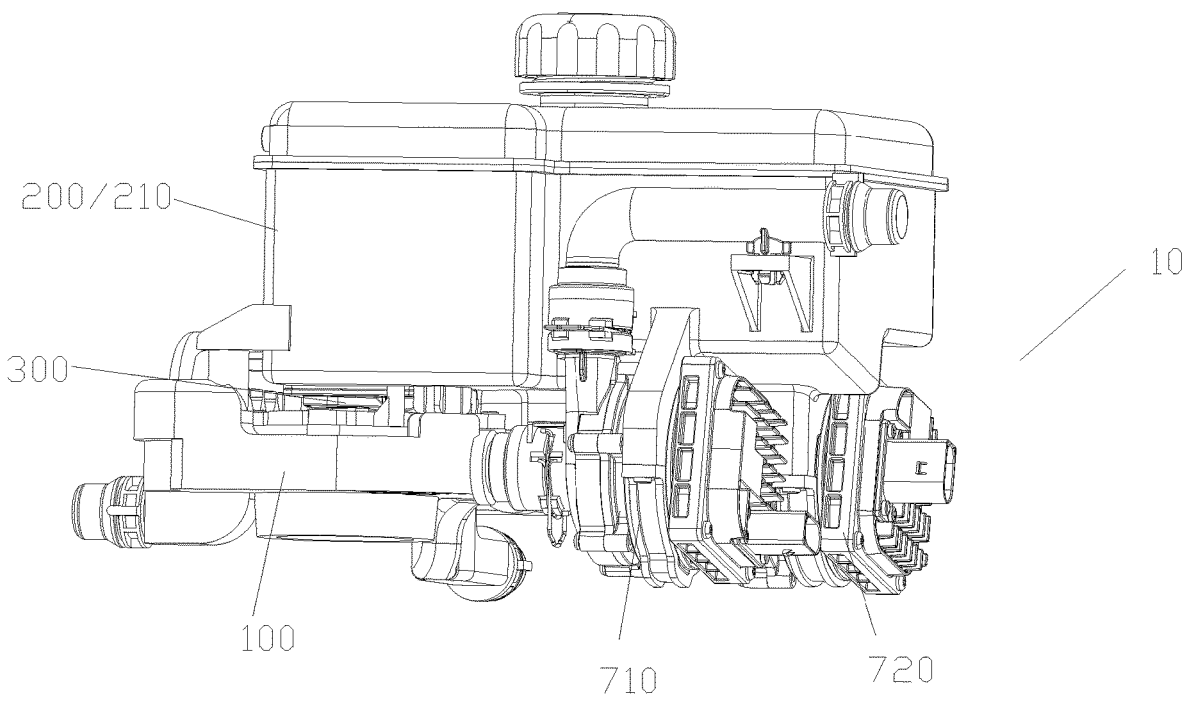
FIG. 1 is a three-dimensional schematic view showing the structure of a fluid management apparatus according to a first embodiment.
Figure 2:
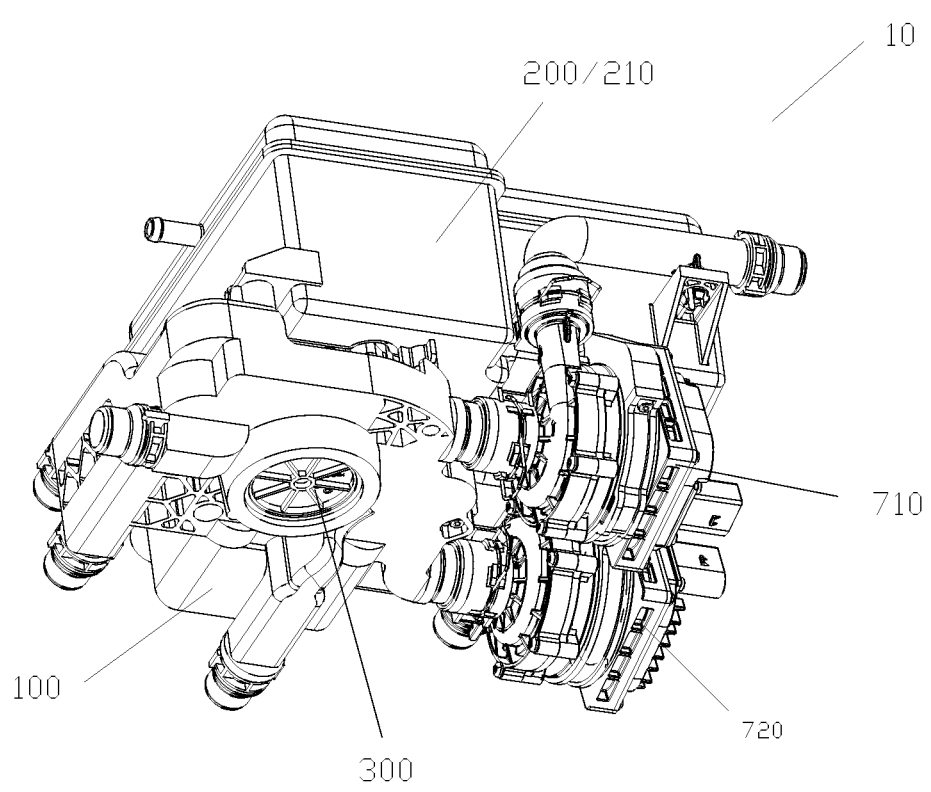
FIG. 2 is a three-dimensional schematic view showing the structure of the fluid management apparatus in FIG. 1 from another perspective.

The fluid management apparatus of the present application can be applied to a thermal management system of a vehicle, the vehicle includes a new energy vehicle, and the fluid at least includes a cooling liquid. The present application is further illustrated hereinafter in conjunction with drawings and specific embodiments.

Referring to FIG. 1 to FIG. 12, the fluid management apparatus 10 includes a connecting member 100, a liquid storage portion and an electric valve 300. The liquid storage portion is used for containing the cooling liquid, and the liquid storage portion has a liquid storage cavity. In the embodiments of the present application, the liquid storage portion may be called a pot 200 or a water can, the pot 200 includes a pot shell 210, and the pot 200 has a cavity (not shown). In this embodiment, the liquid storage cavity may also be called a pot cavity, and the pot cavity is located in the pot shell 210. The pot shell 210 may be of an integral structure, or may be formed by connecting two or more shells. The pot shell 210 includes a first matching portion 211, the connecting member 100 includes a first connecting port portion 120 and a second connecting port portion 130, the connecting member 100 is further provided with a flow channel 110, the flow channel 110 is located in the connecting member 100, the first matching portion 211 and the first connecting port portion 120 are fixedly connected or limitedly connected, and the joint therebetween is sealed, the first connecting port portion 120 is in communication with the flow channel 110, the first matching portion 211 is in communication with the pot cavity, so that the pot cavity is in communication with the flow channel 110, the connection manner may be welding, bonding, inserting, clamping or threaded connection. In a specific embodiment, at least part of the first connecting port portion 120 is located in the cavity formed in the first matching portion 211, in the fluid management apparatus, a sealing ring may also be provided between the first matching portion 211 and the first connecting port portion 120 to enhance the sealing performance; of course, alternatively, the first matching portion 211 may be located in the cavity formed in the first connecting port portion 120, which is not described in detail.

The electric valve 300 includes a valve shell 350, a valve stem 330, an electric control portion 320 and a valve core portion 340, the electric control portion 320 is in transmission connection with the valve stem 330, and the valve stem 330 is connected with the valve core portion 340 in a fixed manner or a limited manner. The valve shell 350 has a first accommodation cavity 352, and at least part of the valve core portion 340 is located in the first accommodation cavity 352. The electric control portion 320 can drive the valve stem 330 to make the valve core portion 340 move in the first accommodation cavity 352, the movement of the valve core portion 340 in the first accommodation cavity 352 includes the rotary movement around the valve stem 330 and/or the axial movement along the valve stem 330. In this embodiment, the valve core portion 340 can rotate around the valve stem 330 by a certain angle. The valve shell 350 includes a second matching portion 353, and the second matching portion 353 is sealed with the second connecting port portion 130, the valve shell 350 has a passage 355 which can be in communication with the first accommodation cavity 352, the passage 355 is in communication with the flow channel 110, so that the flow channel can be in communication with the first accommodation cavity 352.

An axial direction of the valve stem 330 is defined as the up-down direction, the electric control portion 320 is located above the valve core portion 340, and at least part of the connecting member 100 is located below the pot shell 210. In this embodiment, during the operation of the fluid management apparatus 10, the fluid in the fluid management apparatus 10 is a cooling liquid, the fluid management apparatus 10 is provided with the connecting member 100, and the connecting member 100 has the flow channel 110, the flow channel 110 may communicate the pot cavity and the first accommodation cavity 352, the electric valve 300 is connected with the connecting member 100, and the electric control portion 320 is located above the valve core portion 340. That is, the electric control portion 320 is located above the first accommodation cavity 352, which can reduce the probability that the cooling liquid in the first accommodation cavity 352 enters the electric control portion 320, to prevent the cooling liquid from damaging the live parts of the electric control portion 320, thereby improving the service life of the electric control portion 320 and the service life of the fluid management apparatus. At least part of the connecting member 100 is located below the pot shell 210, when the fluid management apparatus 10 is applied in practice; it is convenient for communication between the cooling liquid in the pot cavity with the cooling liquid in the flow channel 110.

Figure 3:
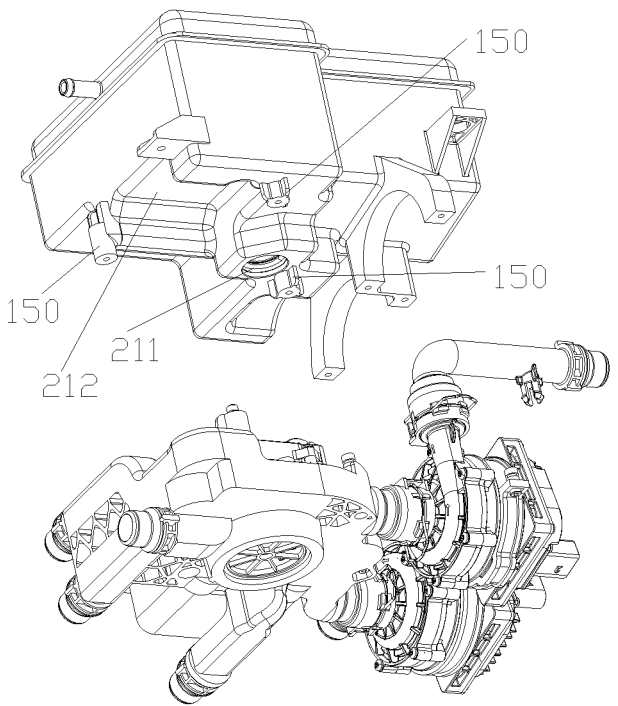
FIG. 3 is a schematic view showing the structure of the fluid management apparatus in FIG. 1 in a first exploded form.
Figure 4:
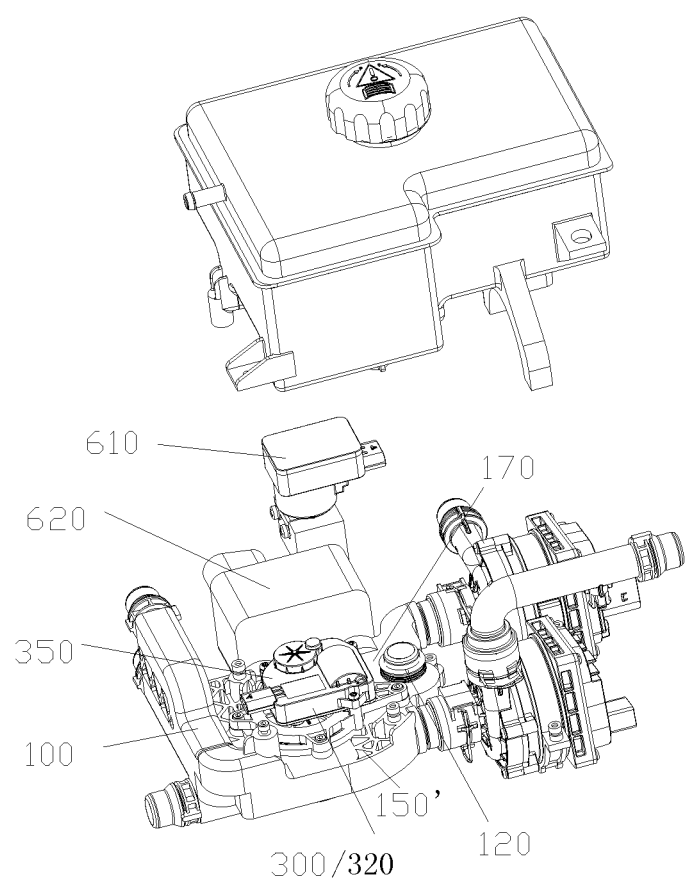
FIG. 4 is a schematic exploded view showing the structure of the fluid management apparatus in FIG. 3 from another perspective.
Figure 5:
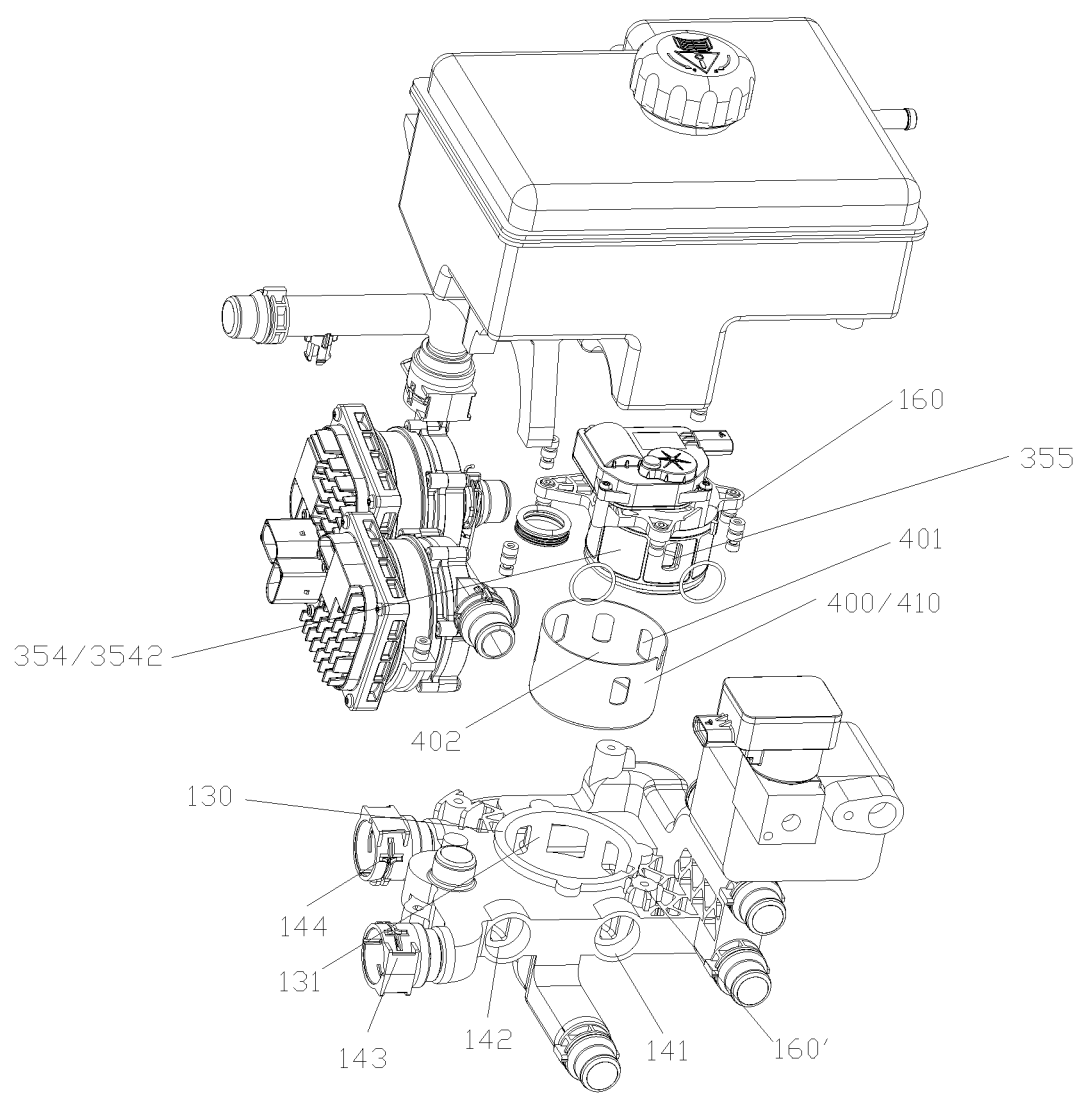
FIG. 5 is a schematic view showing the structure of the fluid management apparatus in FIG. 1 in a first exploded form.
Figure 6:
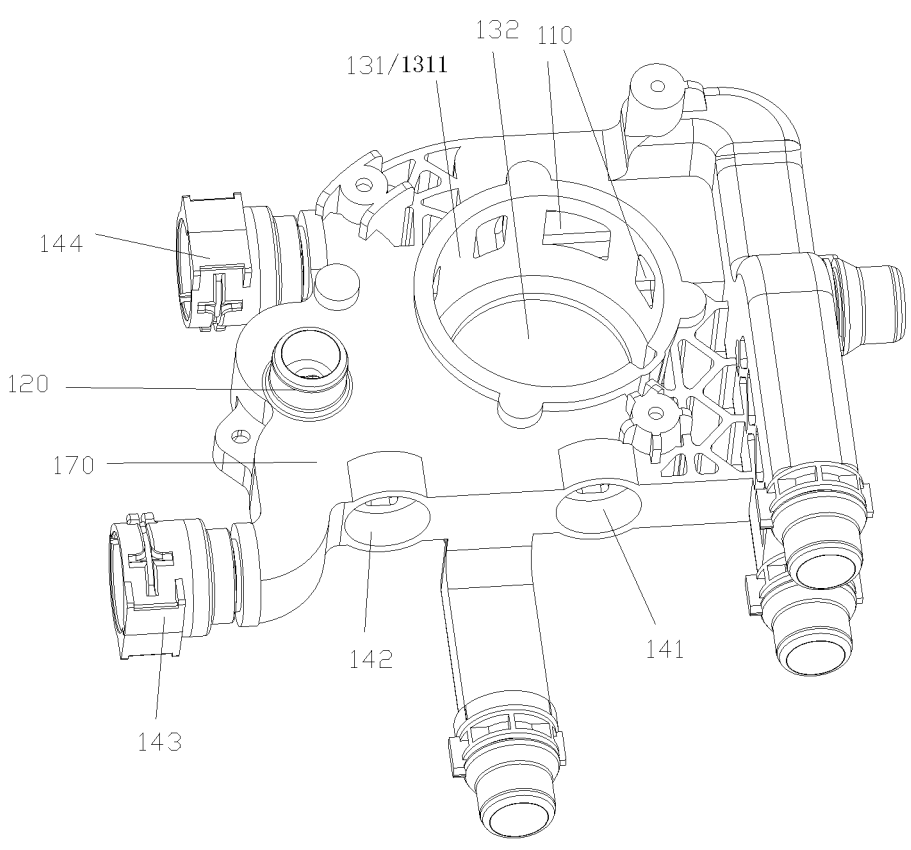
FIG. 6 is a three-dimensional schematic view showing the structure of a connecting member in FIG. 1.
Figure 7:
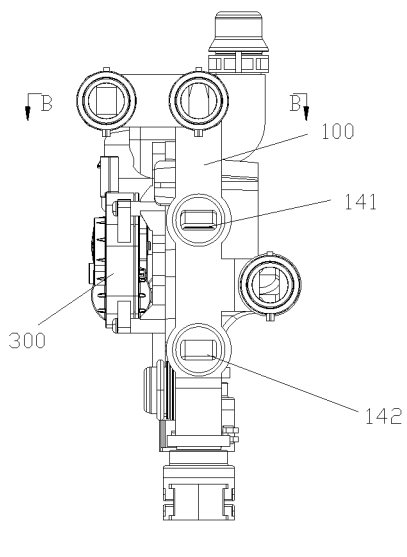
FIG. 7 is a schematic front view of the connecting member and an electric valve in FIG. 6.

Referring to FIG. 3 to FIG. 5, the connecting member 100 includes a first side portion 170, the first side portion 170 faces a bottom 212 of the pot shell, the first connecting port portion 120 protrudes toward the bottom 212 of the pot shell relative to the first side portion 170, the first matching portion 211 is formed at the bottom 212 of the pot shell, in this way, the connecting member 100 is located below the pot shell 210, which facilitates the communication of the cooling liquid in the fluid management apparatus 10. An opening of the second connecting port portion 130 faces the bottom 212 of the pot shell, in the axial direction of the valve stem 330, the electric control portion 320 is closer to the bottom 212 of the pot shell than the second connecting port portion 130. At least part of the connecting member 100 is located below the pot shell 210, the electric valve 300 is also located below the pot shell 210, in this way, the structure of the fluid management apparatus 10 is relatively compact, a center of mass is relatively close to a geometric center of the fluid management apparatus 10, which is also beneficial to the structural stability of the fluid management apparatus 10. In other embodiments, the opening of the first connecting port portion 120 may be located at the first side portion 170, and the opening of the first connecting port portion 120 faces the bottom 212 of the pot shell.

As shown in FIG. 3 to FIG. 4, the fluid management apparatus 10 includes a first mounting portion 150 and a matching portion 150' of the first mounting portion, one of the first mounting portion 150 and the matching portion 150' of the first mounting portion is located at the pot shell 210, the other one of the first mounting portion 150 and the matching portion 150' of the first mounting portion is located at the connecting member 100, the first mounting portion 150 and the matching portion 150' of the first mounting portion cooperate with each other to realize the fixed connection between the connecting member and the pot. In this embodiment, the first mounting portion 150 is located at the connecting member 100, the first mounting portion 150 is formed as a threaded hole, the matching portion 150' of the first mounting portion is a through hole, the first mounting portion and the matching portion 150' of the first mounting portion are connected by a bolt, and the connecting member 100 and the pot shell 210 are fixedly connected or limitedly connected.

As shown in FIG. 5, the fluid management apparatus 10 includes a second mounting portion 160 and a matching portion 160' of the second mounting portion, one of the second mounting portion 160 and the matching portion 160' of the second mounting portion is located at the pot shell 210, the other one of the second mounting portion 160 and the matching portion 160' of the second mounting portion is located at the valve shell 350, the second mounting portion 160 and the matching portion 160' of the second mounting portion cooperate with each other to fix the electric valve and the connecting member. The connection manner between the second mounting portion 160 and the matching portion 160' of the second mounting portion may be the same as or different from that between the first mounting portion and the matching portion 150' of the first mounting portion, which is not described in detail. In a more specific embodiment, in a radial direction of the first accommodation cavity 352, the second mounting portion 160 is closer to the first accommodation cavity 352 than the first mounting portion 150, the fixed position of the electric valve is closer to the center than the fixed position of the pot, which facilitates stability of the structural performance of the fluid management apparatus 10.

Referring to FIG. 5, FIG. 6 and FIG. 10 to FIG. 12, the valve shell 350 includes a main body portion 354, the main body portion 354 includes a first accommodation portion 351, and the first accommodation portion 351 has a first accommodation cavity 352; the second connecting port portion 130 includes a second accommodation portion 131, and the second accommodation portion 131 has a second accommodation cavity 132; at least part of the main body portion 354 is located in the second accommodation cavity 132. In this embodiment, the second matching portion 353 is formed on an outer wall 3542 of the main body portion, the passage 355 is formed in the main body portion 354, in the radial direction of the first accommodation cavity 352, the passage 355 runs through the main body portion 354, the passage 355 has a passage port provided on each of an inner wall and outer wall 3542 of the main body portion, correspondingly, the flow channel 110 has a flow channel port provided on a wall 1311 of the second accommodation portion 131, and the flow channel port is arranged to face at least part of the passage port, so that the flow channel 110 is in communication with the corresponding passage 355. In other embodiments, the passage may also be formed at the bottom of the valve shell. The main body portion 354 is at least partially located in the second accommodation portion 131, which can reduce the volume of the fluid management apparatus 10 and make the structure compact. In this embodiment, the main body portion 354 is cylindrical; in other embodiments, the shape of the main body portion may also be square or other shapes.

The fluid management apparatus 10 includes a sealing piece 400, the sealing piece 400 is located in the second accommodation cavity 132, and the sealing piece 400 is arranged to surround the passage port. One side of the sealing piece 400 is in contact with the wall 1311 of the second accommodation portion, the other side of the sealing piece 400 is in contact with the outer wall of the main body portion 354, the sealing piece 400 is in a pressed state to ensure the sealing effect. The sealing piece 400 has a communication port 401, the flow channel port is in communication with the passage port through the communication port 401 of the sealing piece. The sealing piece 400 may be a sealing ring, when the sealing piece 400 is a sealing ring, the main body portion 354 and/or the connecting member 100 may be provided with a groove for accommodating the sealing ring; the sealing piece 400 may also be a gasket. The electric valve 300 has multiple passage ports, and the number of sealing piece 400 matches the number of passage ports, the sealing piece 400 may be independent parts or be of an integrated structure.

In this embodiment, the sealing piece 400 is of an integral structure, the sealing piece 400 is cylindrical to match the shape of the main body portion 354, a side portion 410 of the sealing piece 400 abuts against the outer wall 3542 of the main body portion 354 and the wall of the second accommodation portion 131, the sealing piece 400 has an accommodation cavity 402, at least part of the main body portion 354 is located in the accommodation cavity 402 of the sealing piece 400, the communication ports 401 are formed on the side portion 410 of the sealing piece, correspondingly, the passage ports are formed on the main body portion 354, and the flow channel ports are formed on the side wall of the second accommodation portion 131. The fluid management apparatus 10 may further include a rib 500, the rib 500 presses the sealing piece 400 to enhance the sealing. Specifically, the rib 500 includes a first ring portion 510, a second ring portion 520 and at least two axial portions 530, in the axial direction of the valve stem 330, one end of the axial portion 530 is connected with the first ring portion 510, the other end of the axial portion 530 is connected with the second ring portion 520, the rib 500 is formed at the valve shell 350, the rib 500 protrudes toward the second accommodation portion 131 relative to the outer wall 3542 of the main body portion 354, the passage port is located between adjacent axial portions 530; in this way, the passage port is located in the area surrounded by the rib 500, and the sealing performance of the fluid management apparatus 10 can be improved by providing the rib 500. In other embodiments, the rib 500 may also be formed on the connecting member 100, the rib 500 protrudes toward the main body portion 354 relative to the wall of the second accommodation portion 131, the flow channel port is located between adjacent axial portions 530, which is not described in detail. In other embodiments, no sealing pieces are provided in the fluid management apparatus separately, instead, the rib is in direct contact with an inner wall of the second accommodation portion, the rib has a sealing function, and the material of the rib may be different from the material of other parts of the main body portion, and the rib is integrally injection-molded with other material of the main body portion.

Figure 8:
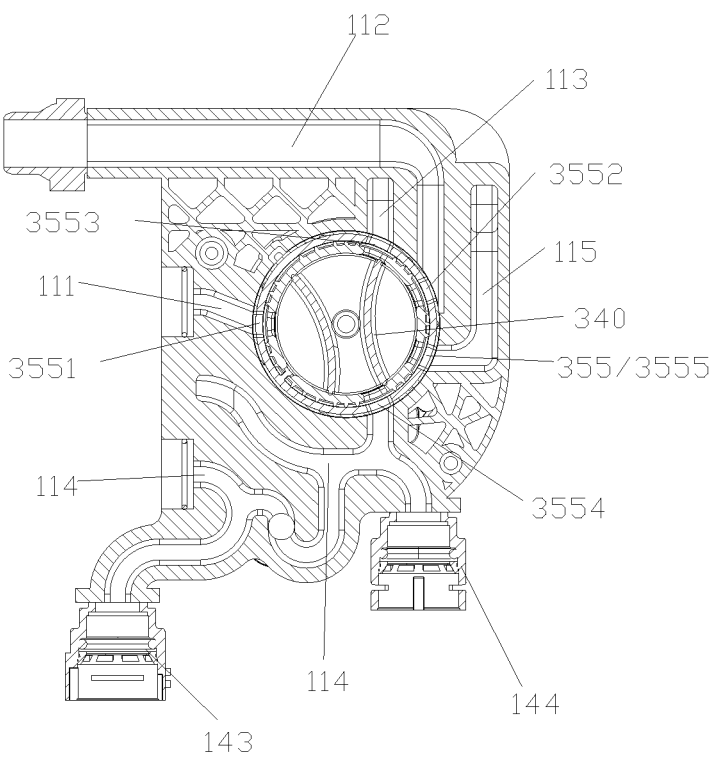
FIG. 8 is a schematic sectional view of FIG. 7 taken along A-A.
Figure 9:
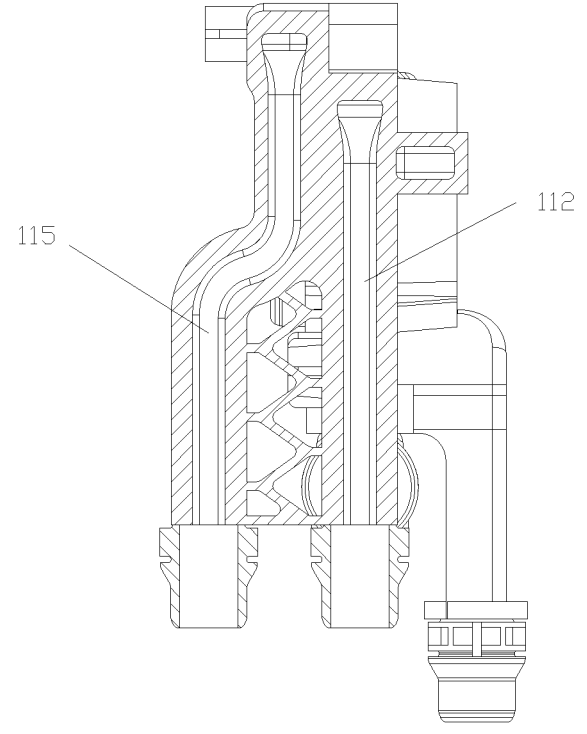
FIG. 9 is a schematic sectional view of FIG. 7 taken along B-B.
Figure 10:
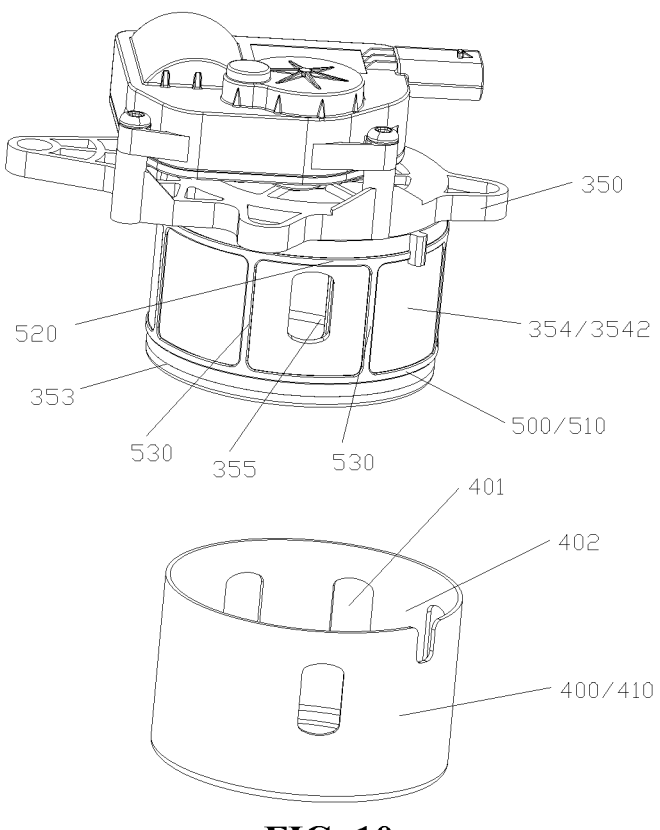
FIG. 10 is a schematic exploded view of the electric valve and a sealing piece.
Figure 11:
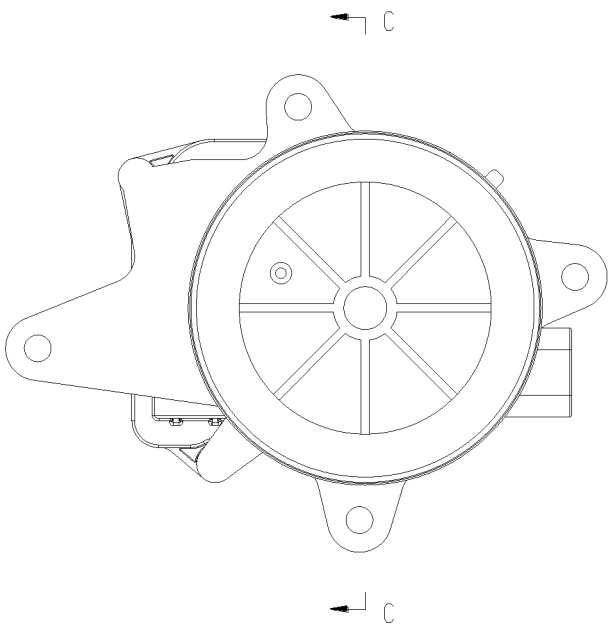
FIG. 11 is a schematic top view of the electric valve.
Figure 12:
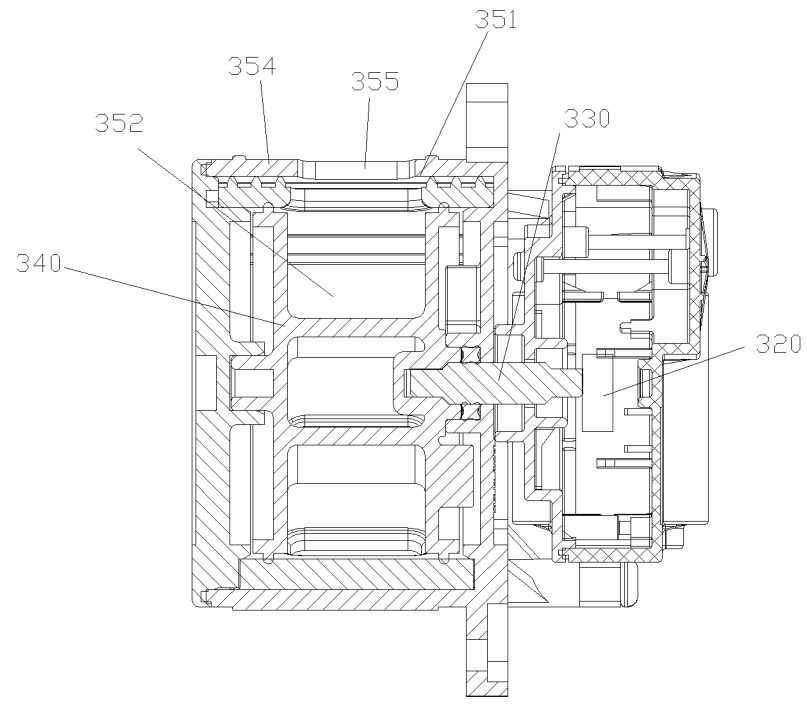
FIG. 12 is a schematic sectional view of FIG. 11 taken along C-C.

In this embodiment, referring to FIG. 8, the electric valve 300 is a five-way valve, and the number of passage in the valve shell 350 is five. That is, the passage of electric valve 300 includes a first passage 3551, a second passage 3552, a third passage 3553, a fourth passage 3554 and a fifth passage 3555. The five passages all run through the main body portion, correspondingly, the number of flow channels of the fluid management apparatus 10 is five, that is, the flow channels include a first flow channel 111, a second flow channel 112, a third flow channel 113, a fourth flow channel 114 and a fifth flow channel 115. Each of the five flow channels has a flow channel port at the side wall 1311 of the second accommodation portion, the first flow channel 111 is in communication with the first passage 3551, the second flow channel 112 is in communication with the second passage 3552, the third flow channel 113 is in communication with the third passage 3553, the fourth flow channel 114 is in communication with the fourth passage 3554, and the fifth flow channel 115 is in communication with the fifth passage 3555. Of course, the electric valve 300 may also have other number of ways or be a proportional regulating valve, which is not described in detail. The connecting member 100 may be integrally formed by injection molding, or the connecting member 100 is formed by welding or bonding at least two plates. At least a part of the flow channels is formed at the first connecting port portion, the flow channel located at the first connecting port portion is in communication with the fourth flow channel, and then the pot cavity is in communication with the fourth flow channel. At least part of the fourth flow channel is formed at the second connecting port portion, and the corresponding passage is in communication with the fourth flow channel.

In the operation of the fluid management apparatus 10, the fluid management apparatus 10 has at least one of the following six operation modes: in a first operation mode of the fluid management apparatus 10, the valve core portion 340 communicates the second passage 3352 with the third passage 3553, and communicates the fifth passage 3555 with the third passage 3553; and then the valve core portion 340 further communicates the second flow channel 112 with the third flow channel 113, and communicates the fifth flow channel 115 with the third flow channel 113.

In a second operation mode of the fluid management apparatus 10, the valve core portion 340 communicates the second passage 3552 with the third passage 3553, and communicates the fifth passage 3555 with the first passage 3551; and then the valve core portion 340 further communicates the second flow channel 112 with the third flow channel 113, and communicates the fifth flow channel 115 with the first flow channel 111.

In a third operation mode of the fluid management apparatus 10, the valve core portion 340 communicates the second passage 3552 with the first passage 3551, and communicates the fifth passage 3555 with the fourth passage 3554; and then the valve core portion 340 further communicates the second flow channel 112 with the first flow channel 111, and communicates the fifth flow channel 115 with the fourth flow channel 114.

In a fourth operation mode of the fluid management apparatus 10, the valve core portion 340 communicates the second passage 3552 with the third passage 3553, and communicates the fifth passage 3555 with the fourth passage 3554; and then the valve core portion 340 further communicates the second flow channel 112 with the third flow channel 113, and communicates the fifth flow channel 115 with the fourth flow channel 114.

In a fifth operation mode of the fluid management apparatus 10, the valve core portion 340 communicates the second passage 3552 with the fourth passage 3554, and communicates the fifth passage 3555 with the fourth passage 3554; and then the valve core portion 340 further communicates the second flow channel 112 with the fourth flow channel 114, and communicates the fifth flow channel 115 with the fourth flow channel 114.

In a sixth operation mode of the fluid management apparatus 10, the valve core portion 340 communicates the fifth passage 3555 with the second passage 3552 or communicates the second passage 3552 with the first passage 3551, the valve core portion 340 communicates the fifth passage 3555 with the first passage 3551; and then the valve core portion 340 further communicates the fifth flow channel 155 with the second flow channel 112 or communicates the second flow channel 112 with the first flow channel 111, and communicates the fifth flow channel 115 with the first flow channel 111.

Referring to FIG. 1 to FIG. 6 and FIG. 14, the fluid management apparatus 10 includes a throttle valve 610, a first heat exchanger 620, a first pump 710 and/or a second pump 720, the throttle valve 610 is fixedly connected or limitedly connected with the first heat exchanger 620, the first heat exchanger 620 is provided with a first heat exchange passage and a second heat exchange passage, the throttle valve 610 can throttle and depressurize the refrigerant entering the first heat exchange passage. The fluid management apparatus 10 includes a first connecting portion 141, a second connecting portion 142, a third connecting portion 143 and a fourth connecting portion 144, and the connecting portions are formed on the connecting member 100 or located on a pipe fitting or a block which is fixedly connected or limitedly connected with the connecting member 100. At least part of the first flow channel 111 is formed on the first connecting portion 141, at least part of the fourth flow channel 114 is located in the second connecting portion 142, the first connecting portion 141 and the second connecting portion 142 are fixedly connected or limitedly connected with the first heat exchanger 620, then the first flow channel 111 is in communication with the second heat exchange passage, and the fourth flow channel 114 is in communication with the second heat exchange passage, in other words, the first flow channel 111 can be in communication with the fourth flow channel 114 through the second heat exchange passage. The first heat exchanger 620 and the connecting member 100 may be fixed by bolts or by bonding. At least another part of the fourth flow channel 114 is formed on the third connecting portion 143, the first pump 710 is fixedly connected or limitedly connected with the third connecting portion 143, then the fourth flow channel 114 is in communication with the cavity of the first pump 710; at least yet another part of the fourth flow channel 114 is located in the fourth connecting portion 144, the second pump 720 is fixedly connected or limitedly connected with the fourth connecting portion 144, then the fourth flow channel 114 is in communication with the cavity of the second pump 720. The first pump 710 and/or the second pump 720 can provide power for the flowing of the cooling liquid in the thermal management system.

Figure 13:
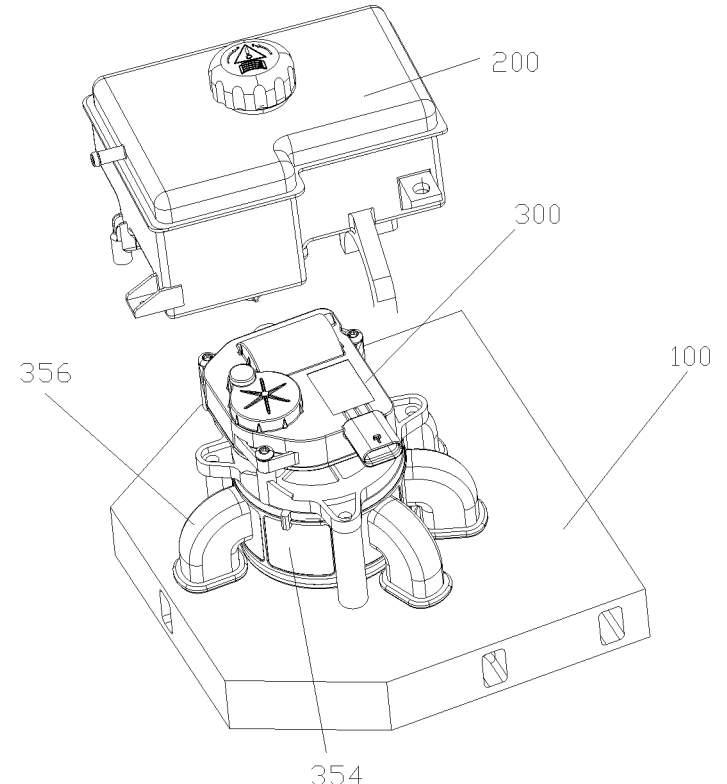
FIG. 13 is a schematic exploded view showing the structure of a fluid management apparatus according to a second embodiments.

Referring to a second embodiment shown in FIG. 13, the valve shell 350 includes a main body portion 354 and pipe portions 356, in this embodiment, the number of pipe portions is five, correspondingly, the connecting member 100 includes five second connecting port portions 130, and the first accommodation cavity 352 is located in the main body portion 354. In an axial direction of the valve stem 330, the connecting member 100 is located at one side of the main body portion 354, and the pot shell 210 is located at another side of the main body portion 354 opposite to the one side. In a radial direction of the first accommodation cavity 352, at least a part of the pipe portions 356 protrudes from the side wall of the main body portion 354, the passages are formed in the pipe portions 356 and the main body portion 354, and each of the passages has an opening on an inner wall of the main body portion. In this embodiment, the second matching portion 353 is formed in each of the pipe portions 356.

Figure 14:
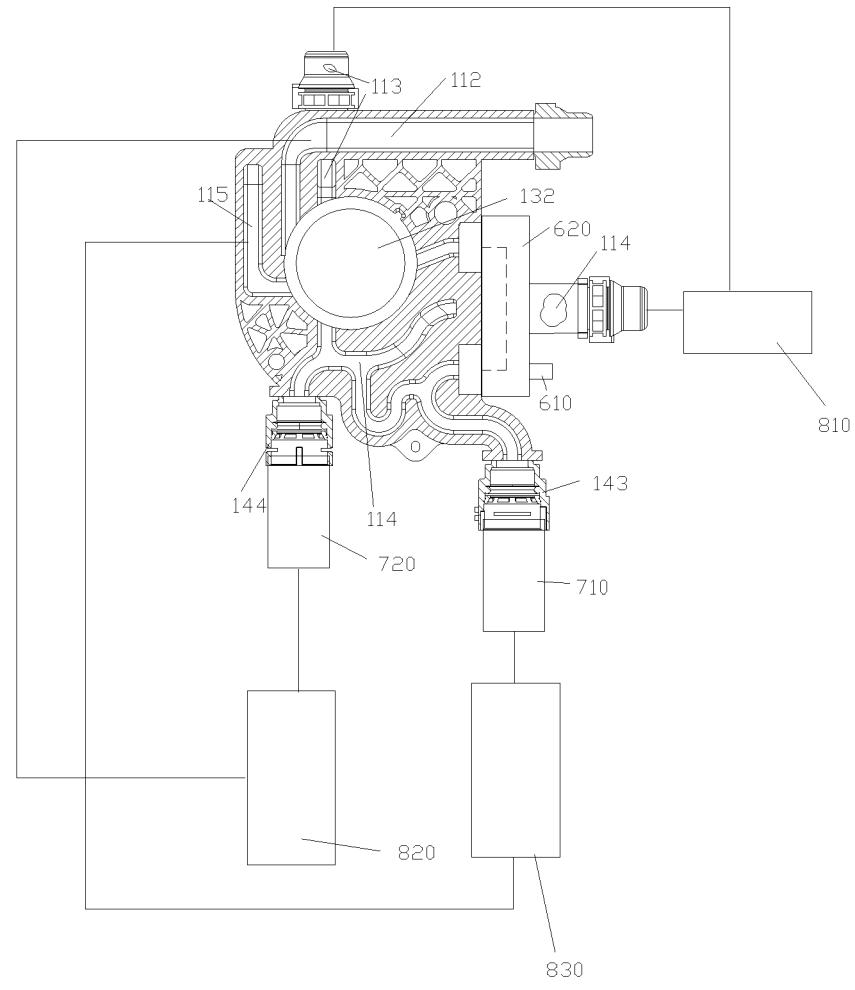
FIG. 14 is a schematic diagram showing the connection of a thermal management system.

Referring to FIG. 14, a thermal management system is further provided according to the technical solution of the present application, the thermal management system includes a radiator 810, a second heat exchanger 820, a third heat exchanger 830 and the fluid management apparatus 10. The second heat exchanger 820 can adjust the temperature of the battery, and the third heat exchanger 830 can adjust the temperature of heating equipment such as motors. The fluid management apparatus 10 includes the throttle valve 610, the first heat exchanger 620, the first pump 710 and/or the second pump 720, where the throttle valve 610 is fixedly connected or limitedly connected with the first heat exchanger 620, the first heat exchanger 620 has the first heat exchange passage and the second heat exchange passage, the throttle valve 610 can throttle and depressurize the refrigerant entering the first heat exchange passage; the first flow channel 111 is in communication with the fourth flow channel 114 through the second heat exchange passage, the fourth flow channel 114 is in communication with the cavity of the first pump 710, and the fourth flow channel 114 is in communication with the cavity of the second pump 720.

The third flow channel 113 is in communication with the fourth flow channel 114 through the radiator 810, the second flow channel 112 is in communication with the second pump 720 through the second heat exchanger 820, and the fifth flow channel 115 is in communication with the first pump 710 through the third heat exchanger 830. The fluid management apparatus 10 is provided in the thermal management system, which can reduce the pipeline connection of the system and simplify the structure of the thermal management system.

It should be noted that the above embodiments are merely used to illustrate the present application and not to limit the technical solutions described in the present application. Although the present application has been described herein in detail with reference to the above embodiments, those of ordinary skill in the art should understand that, those skilled in the art may still make modifications or equivalent replacements to the present application, and all technical solutions and its improvements that do not apart from the scope of the present application should be covered by the scope of the claims of the present application.

The invention claimed is:

1. A fluid management apparatus, comprising a connecting member and a liquid storage portion, wherein the connecting member and the liquid storage portion are arranged separately, the connecting member is fixedly connected or limitedly connected with the liquid storage portion; the liquid storage portion comprises a liquid storage portion shell and a liquid storage cavity, the connecting member comprises a first connecting port portion, the liquid storage portion shell comprises a first matching portion, the first matching portion is sealedly connected with the first connecting port portion; the connecting member is provided with a flow channel, the flow channel is located in the connecting member, and the liquid storage cavity is in communication with the flow channel, wherein the connecting member comprises a second connecting port portion, the fluid management apparatus comprises an electric valve, and the electric valve comprises a valve shell and a valve core portion; the valve shell has a first accommodation cavity, and at least part of the valve core portion is located in the first accommodation cavity; the valve shell comprises a second matching portion, and the second matching portion is sealedly connected with the second connecting port portion; the valve shell is provided with a passage, and the passage is in communication with the flow channel.

2. The fluid management apparatus according to claim 1, wherein the electric valve comprises a valve stem and an electric control portion, the electric control portion is in transmission connection with the valve stem, the valve stem is fixedly connected or limitedly connected with the valve core portion, the passage is configured to be in communication with the first accommodation cavity; with an axial direction of the valve stem being defined as an up-down direction, the electric control portion is located above the valve core portion, and at least part of the connecting member is located below the liquid storage portion shell.

3. The fluid management apparatus according to claim 2, wherein an opening of the first connecting port portion faces a bottom of the liquid storage portion shell, and the first matching portion is formed at the bottom of the liquid storage portion shell; and an opening of the second connecting port portion faces the bottom of the liquid storage portion shell, in the axial direction of the valve stem, the electric control portion is closer to the bottom of the liquid storage portion shell than the second connecting port portion.

4. The fluid management apparatus according to claim 3, wherein the valve shell comprises a main body portion and at least two pipe portions, correspondingly, the connecting member comprises at least two second connecting port portions, the first accommodation cavity is located at the main body portion; in the axial direction of the valve stem, the connecting member is located at one side of the main body portion, and the liquid storage portion shell is located at another side of the main body portion opposite to the one side; in a radial direction of the first accommodation cavity, at least a part of the at least two pipe portions protrudes from a side wall of the main body portion; the passage is formed in the pipe portion and the main body portion, the passage has an opening on an inner wall of the main body portion, and the second matching portion is formed at the at least two pipe portions; or, the valve shell comprises a main body portion, the first accommodation cavity is located in the main body portion, the second connecting port portion comprises a second accommodation portion, the second accommodation portion has a second accommodation cavity, and at least part of the main body portion is located in the second accommodation cavity; in a radial direction of the first accommodation cavity, the passage runs through the main body portion, the passage has a passage port provided on each of the inner wall and outer wall of the main body portion; the flow channel has a flow channel port provided on a wall of the second accommodation portion, and the flow channel port is arranged to face at least part of the passage port.

5. The fluid management apparatus according to claim 3, comprising a pump, wherein the connecting member comprises a connecting portion, part of the flow channel is formed at the connecting portion, the pump is fixedly connected or limitedly connected with the connecting portion, and the flow channel is in communication with a cavity of the pump.

6. The fluid management apparatus according to claim 2, wherein the valve shell comprises a main body portion and at least two pipe portions, correspondingly, the connecting member comprises at least two second connecting port portions, the first accommodation cavity is located at the main body portion; in the axial direction of the valve stem, the connecting member is located at one side of the main body portion, and the liquid storage portion shell is located at another side of the main body portion opposite to the one side; in a radial direction of the first accommodation cavity, at least a part of the at least two pipe portions protrudes from a side wall of the main body portion; the passage is formed in the pipe portion and the main body portion, the passage has an opening on an inner wall of the main body portion, and the second matching portion is formed at the at least two pipe portions; or, the valve shell comprises a main body portion, the first accommodation cavity is located in the main body portion, the second connecting port portion comprises a second accommodation portion, the second accommodation portion has a second accommodation cavity, and at least part of the main body portion is located in the second accommodation cavity; in a radial direction of the first accommodation cavity, the passage runs through the main body portion, the passage has a passage port provided on each of the inner wall and outer wall of the main body portion; the flow channel has a flow channel port provided on a wall of the second accommodation portion, and the flow channel port is arranged to face at least part of the passage port.

7. The fluid management apparatus according to claim 6, wherein at least part of the main body portion is located in the second accommodation cavity; in the radial direction of the first accommodation cavity, the passage runs through the main body portion, the passage has the passage port provided on each of the inner wall and outer wall of the main body portion, and the flow channel port is formed on the side wall of the second accommodation portion.

8. The fluid management apparatus according to claim 7, comprising a sealing piece, the sealing piece is located in the second accommodation cavity, and the sealing piece is arranged to surround the passage port, one side of the sealing piece is in contact with the wall of the second accommodation portion, the other side of the sealing piece is in contact with the outer wall of the main body portion, and the sealing piece is in a pressed state; the sealing piece has a communication port, the flow channel port is in communication with the passage port through the communication port of the sealing piece.

9. The fluid management apparatus according to claim 8, wherein the sealing piece is cylindrical, the sealing piece has an accommodation cavity, at least part of the main body portion is located in the accommodation cavity of the sealing piece, the communication port of the sealing piece is formed on a side portion of the sealing piece; the passage port is formed on the main body portion, the flow channel port is formed on the side wall of the second accommodation portion; the fluid management apparatus comprises a rib, the rib is in contact with the sealing piece and presses the sealing piece, the rib comprises a first ring portion, a second ring portion and at least two axial portions; in the axial direction of the valve stem, one end of each of the at least two axial portions is connected with the first ring portion, the other end of each of the at least two axial portions is connected with the second ring portion; and wherein the rib is formed on the valve shell, the rib protrudes toward the second accommodation portion relative to the outer wall of the main body portion, and the passage port is located between adjacent axial portions; and/or, the rib is formed on the connecting member, the rib protrudes toward the main body portion relative to the wall of the second accommodation portion, and the flow channel port is located between adjacent axial portions.

10. The fluid management apparatus according to claim 6, comprising a pump, wherein the connecting member comprises a connecting portion, part of the flow channel is formed at the connecting portion, the pump is fixedly connected or limitedly connected with the connecting portion, and the flow channel is in communication with a cavity of the pump.

11. The fluid management apparatus according to claim 2, comprising a pump, wherein the connecting member comprises a connecting portion, part of the flow channel is formed at the connecting portion, the pump is fixedly connected or limitedly connected with the connecting portion, and the flow channel is in communication with a cavity of the pump.

12. The fluid management apparatus according to claim 1, comprising a pump, wherein the connecting member comprises a connecting portion, part of the flow channel is formed at the connecting portion, the pump is fixedly connected or limitedly connected with the connecting portion, and the flow channel is in communication with a cavity of the pump.

13. The fluid management apparatus according to claim 12, comprising a first heat exchanger, wherein the pump comprises a first pump and a second pump; the flow channel comprises a first flow channel, a second flow channel, a third flow channel and a fourth flow channel; and wherein the connecting portion comprises a first connecting portion, a second connecting portion, a third connecting portion and a fourth connecting portion; at least part of the first flow channel is formed at the first connecting portion, at least part of the fourth flow channel is formed at the second connecting portion; the first connecting portion and the second connecting portion are fixedly connected or limitedly connected with the first heat exchanger, and the first flow channel is in communication with the fourth flow channel through a heat exchange passage of the first heat exchanger; and at least part of the fourth flow channel is formed at the third connecting portion, the first pump is fixedly connected or limitedly connected with the third connecting portion, the fourth flow channel is in communication with a cavity of the first pump, at least another part of the fourth flow channel is located at the fourth connecting portion, the second pump is fixedly connected or limitedly connected with the fourth connecting portion, the fourth flow channel is in communication with a cavity of the second pump.

14. The fluid management apparatus according to claim 13, wherein at least a part of the flow channels is formed at the first connecting port portion, the liquid storage cavity is in communication with the fourth flow channel, at least yet another part of the fourth flow channel is formed in the second connecting port portion, the passage is in communication with the fourth flow channel.

15. The fluid management apparatus according to claim 14, comprising a throttle valve, wherein the throttle valve is fixedly connected or limitedly connected with the first heat exchanger, the first heat exchanger has a first heat exchange passage and a second heat exchange passage, the throttle valve is configured to perform throttling and depressurization to a refrigerant entering the first heat exchange passage, the first flow channel is in communication with the fourth flow channel through the second heat exchange passage; wherein the fluid management apparatus has at least one of the following six operation modes:

in a first operation mode of the fluid management apparatus, the valve core portion communicates the second flow channel with the third flow channel, and communicates the fifth flow channel with the third flow channel;

in a second operation mode of the fluid management apparatus, the valve core portion communicates the second flow channel with the third flow channel, and communicates the fifth flow channel with the first flow channel;

in a third operation mode of the fluid management apparatus, the valve core portion communicates the second flow channel with the first flow channel, and communicates the fifth flow channel with the fourth flow channel;

in a fourth operation mode of the fluid management apparatus, the valve core portion communicates the second flow channel with the third flow channel, and communicates the fifth flow channel with the fourth flow channel;

in a fifth operation mode of the fluid management apparatus, the valve core portion communicates the second flow channel with the fourth flow channel, and communicates the fifth flow channel with the fourth flow channel;

in a sixth operation mode of the fluid management apparatus, the valve core portion communicates the fifth flow channel with the second flow channel or communicates the second flow channel with the first flow channel, and the valve core portion communicates the fifth flow channel with the first flow channel.

16. A thermal management system, comprising a radiator, a second heat exchanger, a third heat exchanger and a fluid management apparatus, wherein the fluid management apparatus is the fluid management apparatus according to claim 1, the fluid management apparatus comprises a throttle valve, a first heat exchanger, a first pump and a second pump, wherein the throttle valve is fixedly connected or limitedly connected with the first heat exchanger, the first heat exchanger has a first heat exchange passage and a second heat exchange passage, the throttle valve is configured to perform throttling and depressurization to a refrigerant entering the first heat exchange passage; the first flow channel is in communication with the fourth flow channel through the second heat exchange passage, the fourth flow channel is in communication with a cavity of the first pump, and the fourth flow channel is in communication with a cavity of the second pump; and the third flow channel is in communication with the fourth flow channel through the radiator, the second flow channel is in communication with the second pump through the second heat exchanger, and the fifth flow channel is in communication with the first pump through the third heat exchanger.

17. The fluid management apparatus according to claim 1, comprising a pump, wherein the connecting member comprises a connecting portion, part of the flow channel is formed at the connecting portion, the pump is fixedly connected or limitedly connected with the connecting portion, and the flow channel is in communication with a cavity of the pump.

* * * * *